(12) United States Patent
Weingarten

(10) Patent No.: US 9,104,610 B2
(45) Date of Patent: Aug. 11, 2015

(54) METHOD, SYSTEM AND MEDIUM FOR ANALOG ENCRYPTION IN A FLASH MEMORY

(75) Inventor: Hanan Weingarten, Herzelia (IL)

(73) Assignee: DENSBITS TECHNOLOGIES LTD., Haifa (IL)

( * ) Notice: Subject to any disclaimer, the term of this patent is extended or adjusted under 35 U.S.C. 154(b) by 538 days.

(21) Appl. No.: 13/081,228

(22) Filed: Apr. 6, 2011

(65) Prior Publication Data

US 2011/0302428 A1    Dec. 8, 2011

Related U.S. Application Data

(60) Provisional application No. 61/321,314, filed on Apr. 6, 2010.

(51) Int. Cl.

| | | |
|---|---|---|
| G06F 21/00 | (2013.01) | |
| G06F 12/14 | (2006.01) | |
| G06F 21/79 | (2013.01) | |
| G09C 1/00 | (2006.01) | |
| H04L 9/06 | (2006.01) | |
| H04L 9/14 | (2006.01) | |
| G11C 11/56 | (2006.01) | |

(52) U.S. Cl.
CPC ............ *G06F 12/1408* (2013.01); *G06F 21/79* (2013.01); *G09C 1/00* (2013.01); *H04L 9/065* (2013.01); *H04L 9/14* (2013.01); *G06F 2221/2107* (2013.01); *G11C 11/5621* (2013.01)

(58) Field of Classification Search
USPC .................. 380/28, 277; 365/185.09, 185.33
See application file for complete search history.

(56) References Cited

U.S. PATENT DOCUMENTS

| | | | |
|---|---|---|---|
| 4,463,375 A | | 7/1984 | Macovski |
| 4,584,686 A | | 4/1986 | Fritze |
| 4,589,084 A | | 5/1986 | Fling et al. |
| 4,866,716 A | | 9/1989 | Weng |
| 5,003,597 A | * | 3/1991 | Merkle ........................ 380/37 |
| 5,077,737 A | | 12/1991 | Leger et al. |
| 5,297,153 A | | 3/1994 | Baggen et al. |
| 5,657,332 A | | 8/1997 | Auclair et al. |
| 5,729,490 A | | 3/1998 | Calligaro et al. |
| 5,793,774 A | | 8/1998 | Usui et al. |
| 5,926,409 A | | 7/1999 | Engh et al. |
| 5,956,268 A | | 9/1999 | Lee |
| 5,982,659 A | | 11/1999 | Irrinki et al. |
| 6,038,634 A | | 3/2000 | Ji et al. |
| 6,094,465 A | | 7/2000 | Stein et al. |
| 6,119,245 A | | 9/2000 | Hiratsuka |
| 6,182,261 B1 | | 1/2001 | Haller et al. |
| 6,192,497 B1 | | 2/2001 | Yang et al. |
| 6,195,287 B1 | | 2/2001 | Hirano |
| 6,199,188 B1 | | 3/2001 | Shen et al. |
| 6,209,114 B1 | | 3/2001 | Wolf et al. |
| 6,259,627 B1 | | 7/2001 | Wong |

(Continued)

OTHER PUBLICATIONS

Search Report of PCT Patent Application WO 2009/118720 A3.

(Continued)

*Primary Examiner* — Joseph P Hirl
*Assistant Examiner* — Chi Nguy
(74) *Attorney, Agent, or Firm* — Dentons US LLP

(57) ABSTRACT

A system and method for analog encryption and decryption, in which the encryption and encoding processes are interrelated, such that by failing to decrypt the retrieved data, decryption fails.

6 Claims, 14 Drawing Sheets

(56) References Cited

U.S. PATENT DOCUMENTS

| | | |
|---|---|---|
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,290,203 B2 | 10/2007 | Emma et al. |
| 7,292,365 B2 | 11/2007 | Knox |
| 7,301,928 B2 | 11/2007 | Nakabayashi et al. |
| 7,441,067 B2 | 10/2008 | Gorobets et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,697,326 B2 | 4/2010 | Sommer et al. |
| 7,706,182 B2 | 4/2010 | Shalvi et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,961,797 B1 | 6/2011 | Yang et al. |
| 8,020,073 B2 | 9/2011 | Emma et al. |
| 8,122,328 B2 | 2/2012 | Liu et al. |
| 2002/0063774 A1 | 5/2002 | Hillis et al. |
| 2002/0085419 A1 | 7/2002 | Kwon et al. |
| 2002/0154769 A1 | 10/2002 | Petersen et al. |
| 2003/0065876 A1 | 4/2003 | Lasser |
| 2003/0101404 A1 | 5/2003 | Zhao et al. |
| 2003/0105620 A1 | 6/2003 | Bowen |
| 2003/0192007 A1 | 10/2003 | Miller et al. |
| 2004/0015771 A1 | 1/2004 | Lasser et al. |
| 2004/0030971 A1 | 2/2004 | Tanaka et al. |
| 2004/0153722 A1 | 8/2004 | Lee |
| 2004/0153817 A1 | 8/2004 | Norman et al. |
| 2004/0181735 A1 | 9/2004 | Xin |
| 2004/0203591 A1* | 10/2004 | Lee ................. 455/410 |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2006/0059406 A1 | 3/2006 | Micheloni et al. |
| 2006/0059409 A1 | 3/2006 | Lee |
| 2006/0064537 A1 | 3/2006 | Oshima et al. |
| 2006/0101193 A1 | 5/2006 | Murin |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2008/0010581 A1 | 1/2008 | Alrod et al. |
| 2008/0028014 A1 | 1/2008 | Hilt et al. |
| 2008/0049497 A1* | 2/2008 | Mo ................. 365/185.03 |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0148115 A1* | 6/2008 | Sokolov et al. .......... 714/719 |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0219050 A1 | 9/2008 | Shalvi et al. |
| 2008/0225599 A1 | 9/2008 | Chae |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0043951 A1 | 2/2009 | Shalvi et al. |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn et al. |
| 2009/0144600 A1 | 6/2009 | Perlmutter et al. |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |

(56) References Cited

U.S. PATENT DOCUMENTS

| | | | |
|---|---|---|---|
| 2009/0228761 A1 | 9/2009 | Perlmutter et al. | |
| 2009/0240872 A1 | 9/2009 | Perlmutter et al. | |
| 2009/0287930 A1* | 11/2009 | Nagaraja | 713/171 |
| 2010/0005270 A1 | 1/2010 | Jiang | |
| 2010/0058146 A1 | 3/2010 | Weingarten et al. | |
| 2010/0064096 A1 | 3/2010 | Weingarten et al. | |
| 2010/0088557 A1 | 4/2010 | Weingarten et al. | |
| 2010/0091535 A1 | 4/2010 | Sommer et al. | |
| 2010/0095186 A1 | 4/2010 | Weingarten | |
| 2010/0110787 A1 | 5/2010 | Shalvi et al. | |
| 2010/0115376 A1 | 5/2010 | Shalvi et al. | |
| 2010/0122113 A1 | 5/2010 | Weingarten et al. | |
| 2010/0124088 A1 | 5/2010 | Shalvi et al. | |
| 2010/0131580 A1 | 5/2010 | Kanter et al. | |
| 2010/0131806 A1 | 5/2010 | Weingarten et al. | |
| 2010/0131809 A1 | 5/2010 | Katz | |
| 2010/0131826 A1 | 5/2010 | Shalvi et al. | |
| 2010/0131827 A1 | 5/2010 | Sokolov et al. | |
| 2010/0131831 A1 | 5/2010 | Weingarten et al. | |
| 2010/0146191 A1 | 6/2010 | Katz | |
| 2010/0146192 A1 | 6/2010 | Weingarten et al. | |
| 2010/0149881 A1 | 6/2010 | Lee et al. | |
| 2010/0180073 A1 | 7/2010 | Weingarten et al. | |
| 2010/0199149 A1 | 8/2010 | Weingarten et al. | |
| 2010/0211724 A1 | 8/2010 | Weingarten | |
| 2010/0211833 A1 | 8/2010 | Weingarten | |
| 2010/0211856 A1 | 8/2010 | Weingarten | |
| 2010/0246265 A1* | 9/2010 | Moschiano et al. | 365/185.11 |
| 2010/0251066 A1 | 9/2010 | Radke | |
| 2010/0253555 A1 | 10/2010 | Weingarten et al. | |
| 2010/0257309 A1 | 10/2010 | Barsky et al. | |
| 2010/0269008 A1* | 10/2010 | Leggette et al. | 714/752 |
| 2010/0293321 A1 | 11/2010 | Weingarten | |
| 2011/0051521 A1 | 3/2011 | Levy et al. | |
| 2011/0055461 A1 | 3/2011 | Steiner et al. | |
| 2011/0096612 A1 | 4/2011 | Steiner et al. | |
| 2011/0099460 A1* | 4/2011 | Dusija et al. | 714/773 |
| 2011/0119562 A1 | 5/2011 | Steiner et al. | |
| 2011/0153919 A1 | 6/2011 | Sabbag | |
| 2011/0161775 A1 | 6/2011 | Weingarten | |
| 2011/0214029 A1 | 9/2011 | Steiner et al. | |
| 2011/0214039 A1 | 9/2011 | Steiner et al. | |
| 2011/0246792 A1 | 10/2011 | Weingarten | |
| 2011/0246852 A1 | 10/2011 | Sabbag | |
| 2011/0252187 A1 | 10/2011 | Segal et al. | |
| 2011/0252188 A1 | 10/2011 | Weingarten | |
| 2011/0271043 A1 | 11/2011 | Segal et al. | |
| 2011/0302428 A1 | 12/2011 | Weingarten | |
| 2012/0001778 A1 | 1/2012 | Steiner et al. | |
| 2012/0005554 A1 | 1/2012 | Steiner et al. | |
| 2012/0005558 A1 | 1/2012 | Steiner et al. | |
| 2012/0005560 A1 | 1/2012 | Steiner et al. | |
| 2012/0008401 A1 | 1/2012 | Katz et al. | |
| 2012/0008414 A1 | 1/2012 | Katz et al. | |
| 2012/0051144 A1 | 3/2012 | Weingarten et al. | |
| 2012/0063227 A1 | 3/2012 | Weingarten et al. | |
| 2012/0066441 A1 | 3/2012 | Weingarten | |
| 2012/0110250 A1 | 5/2012 | Sabbag et al. | |

OTHER PUBLICATIONS

Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Keshab K. Parhi, "Small Area Parallel Chien Search Architectures for Long BCH Codes", Ieee Transactions on Very Large Scale Integration( VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vo. 2, pp. II-369-II-372 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips. com).
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1, 2003.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com, 2005.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26, 2007.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

* cited by examiner

METHOD, SYSTEM AND MEDIUM FOR ANALOG ENCRYPTION IN A FLASH MEMORY

CROSS-REFERENCE TO RELATED APPLICATIONS

This application claims the benefit of U.S. Provisional Patent Application No. 61/321,314, filed Apr. 6, 2010, the entire contents of which are incorporated herein by reference.

FIELD OF THE INVENTION

The present invention relates generally to systems and methods of using a Flash memory, and in particular, to systems and methods of encrypting data stored in multi-level cells of a Flash memory.

BACKGROUND OF THE INVENTION

Encryption is widely used in storage in order to limit the access to confidential information. The common methods of encryption include encrypting the confidential data and storing the encrypted data on the physical medium. This physical medium may include Flash memory devices. It is common that the actual storage method of the physical medium does not depend on whether the data is encrypted or not. Thus, anyone capable of accessing the physical medium will have access to a perfect copy of the encrypted data. However, as this data is encrypted, the attacker will still need to break the code in order to obtain the original data.

FIG. 1 shows a common implementation of a prior art encryption system 100. A key stream generator may apply an encryption algorithm 102, e.g., Advanced Encryption Standard (AES), based on a key 104, e.g., a 128-bit key, which remains constant through the entire transaction or a certain period of time, and which may be set by the user, and based on counter 106, whose value may change based on a clock signal. Counter 106 may be initialized to a different value for every message, for example, depending on an auxiliary key (not shown) which may be available to all sides (including a potential attacker). The output of key stream generator 102 may be pseudo-random key stream ($k_i$) 108. Key stream 108 ($k_i$) may be then XORed with original data 112 (an exclusive OR operation is performed by element 110) to form cipher data (or encrypted data—$e_i$) 114.

A good encryption may be one such that given an output stream and counter values, it would be difficult for a third party, e.g., an attacker, to obtain the key. Nevertheless, attacks may be possible with limited complexity if a long enough output stream is available to an attacker. However, in order to obtain the key from the cipher data, the attacker should have at hand a copy of some of the original data. This may allow the attacker to determine the rest of the original data, after breaking the code. Therefore, one weakness of the encryption scheme described above is that if the attacker knows a sufficient number of bits of the encrypted data, he may reproduce a copy of the original data.

SUMMARY OF EMBODIMENTS OF THE INVENTION

According to embodiments of the invention, there are disclosed methods and systems for encryption and decryption in which data is encrypted using a base key and an auxiliary key, wherein the auxiliary key can only be recovered if there were no errors in the encrypted data. The encrypted data may be stored on a Flash memory. In some embodiments of the invention, prior to storing the data, the block in the flash memory containing the page to store the data may be cycled such that following retention a sufficient number of errors occur to prohibit decoding. In some embodiments of the invention, prior to storing the data, programming thresholds and incremental stepped pulse programming (ISPP) parameters of the Flash memory may be modified so as to increase the number of errors due to retention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
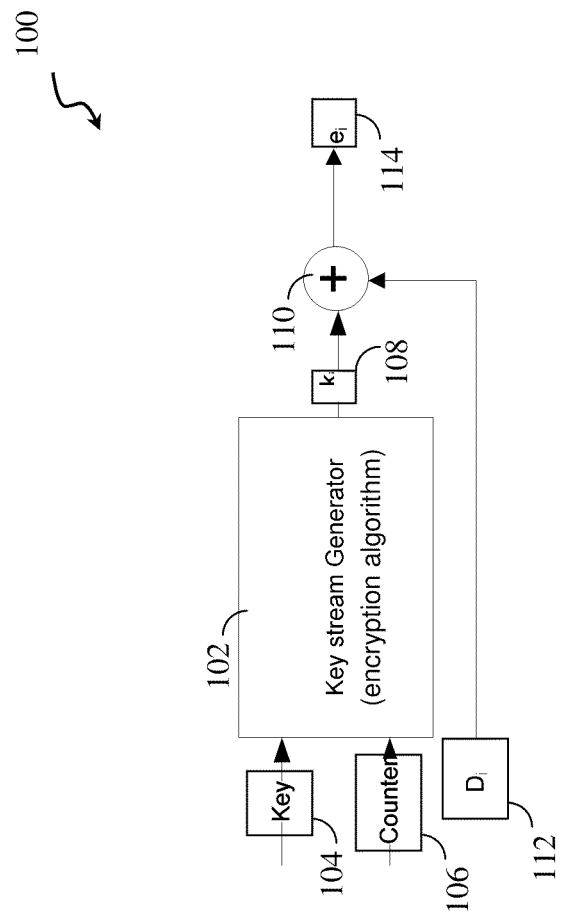
FIG. 1 illustrates a prior art implementation of an encryption system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

An embodiment of the present invention may provide a method, system and non-transitory computer-readable medium for limiting access to a key stream, even if the attacker has access to the underlying encoded data.

According to conventional storage methods, a certain voltage level indicates a logical value. For example, a "1" state may denote an erased state and a "0" state may be a voltage level above a certain threshold. The threshold is typically constant for each programmed cell, and accordingly, any cell with a particular voltage level will be read as the same logical value.

In contrast, according to embodiments of the invention, logical states of "1" and "0" may be stored using threshold levels that may vary from cell to cell in a memory, for example, based on the output of an encryption function. Likewise, in order to read data in cells storing data according to embodiments of the invention, the voltage levels at which to read a cell may be an output of a decryption function. In some embodiments of the invention, a logical value of data stored in a cell may correspond to a plurality of different discrete voltage levels or ranges, or lobes. Thus, for example, a cell that may be programmed to four voltage levels may have two lobes that correspond to a logical "1" and two loves that correspond to a logical "0"; a cell that may be programmed to eight voltage levels may have four lobes that correspond to a logical "1" and four loves that correspond to a logical "0". The identity of the lobes corresponding to each logical value may vary based on an encryption function. As described further below, in some embodiments of the invention, the lobes corresponding to at least one of the logical values may be adjacent, in order to facilitate programming.

An embodiment of the present invention may provide that a different threshold for each cell may be selected based on an encryption function such as an encryption key stream, e.g., a threshold encryption stream, where for each cell, an encryption key stream value may determine the voltage thresholds and other data for programming the cell. For example, the threshold encryption stream may contain a set of binary values that may be input to a physical page information buffer, which in turn, may determine how the key stream data for a cell may be programmed, e.g., by setting different values for programming a logical value to a particular voltage level or lobe determined for the cell. The physical page information buffer information may then be translated to a physical voltage value for lobe programming through a programming sequencer.

A method for encryption may include generating a threshold level encryption key stream, determining a programming levels for each cell for storing a bit of a cipher data stream, where the voltage threshold varies based on a corresponding entry in the threshold level encryption key stream; and programming each cell with a corresponding bit of the cipher data stream based on the programming levels. A non-transitory computer readable medium may include stored instructions to cause a processor to perform a method such as described above.

A system according to an embodiment of the invention may provide a programming sequencer unit, where the programming sequencer unit selects a position for programming a lobe for a cipher data bit based on a value in the threshold level encryption key stream corresponding to the cipher data stream bit and program the cell of a memory according to an assigned lobe.

To better understand the systems and methods embodying the invention described herein, a very short overview of the physical medium of Flash memories is presented. A more detailed description of Flash memories may also be found, for example, in "Nonvolatile Memory Technologies with Emphasis on Flash: A Comprehensive Guide to Understanding and Using NVM Devices", edited by Joe E. Brewer and Manzur Gill, IEEE 2008 (ISBN: 9780471770022).

Nonvolatile Flash memory devices may store information in the form of charge in a Flash memory cell. The cell is typically a complementary metal-oxide semiconductor (CMOS) transistor with an additional floating metal gate between the substrate and the transistors gate. The charge may be stored in the floating gate, and may be injected to the floating gate during a programming operation. The charge may be removed during an erase operation.

To inject charge during a programming operation, a voltage drop may be induced between the source and the drain of the CMOS transistor, and a high voltage may be applied to the gate. Alternatively, a large voltage drop may be induced between the Flash transistor gate and the substrate. The programming operation may typically be done in two steps, which are iteratively repeated until a stop condition is reached: (1) in the charge injection phase, charge is injected to the floating gate, and (2) in the sensing phase, a sensing operation may be performed to determine whether a sufficient amount of charge was injected. The stop condition may be, for example, that the charge is within a particular range or resolution. In certain circumstances, the voltage applied at the gate may be increased between iterations in the charge injection phase in order to force additional charge to be injected. The voltage difference between iterations may be referred to an incremental stepped pulse programming (ISPP) process.

Once the required level of charge has been applied, the programming procedure may be complete. To read the cell, the amount of charge stored in the floating gate is sensed. In order to accomplish this, the gate of the transistor may be set to a certain threshold voltage, $V_{th}$, and it is determined whether the transistor conducts current between source and the drain, and if so, the amount of current conducted. Based on such measurement, it is established whether the stored charge is above or below a certain threshold.

Figure 2:
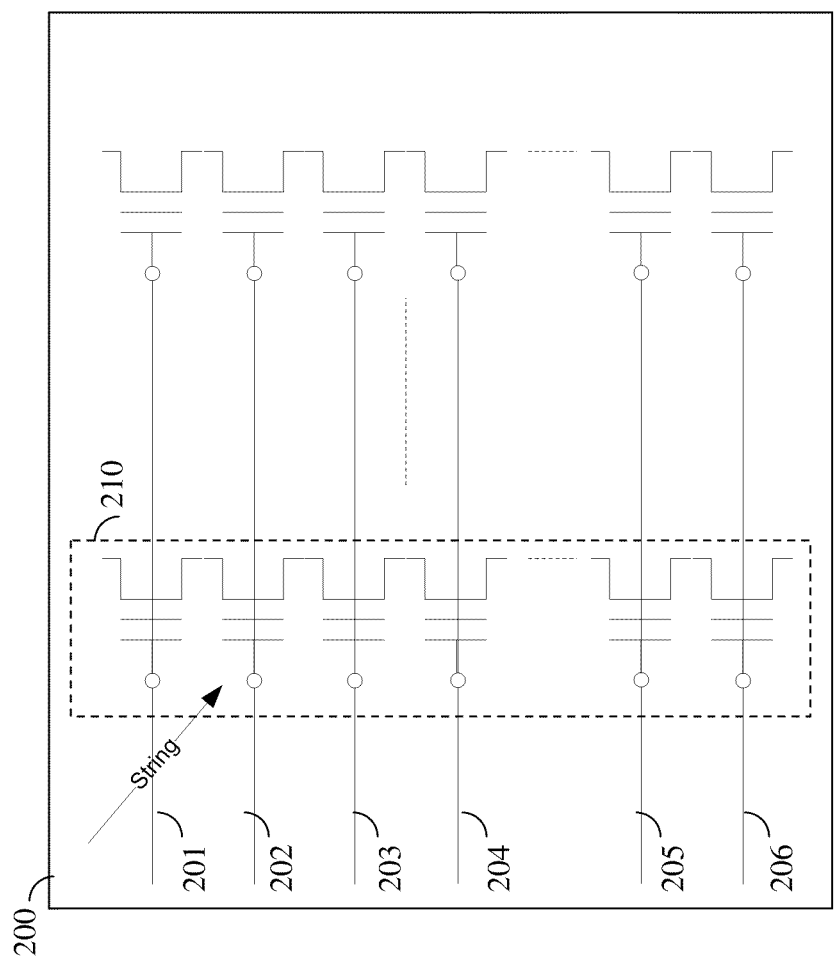
FIG. 2 illustrates a prior art NAND Flash Array diagram.

Reference is now made to FIG. 2, which illustrates a prior art NAND Flash memory array. Array 200 may comprise rows 201-206 and columns (strings) such as column 210. During a read operation, an entire row/page, e.g., row 202, may be read. This may be done by applying a bias voltage to all rows not being read, e.g., rows 201 and 203-206, and applying a reference threshold voltage to the row being read, e.g., 202. The bias voltage may allow the transistors to fully conduct. However, the cells in the row being read, for example, will conduct only if the threshold voltage is sufficiently high to overcome the trapped charge in the cell. Each string may have associated therewith a comparator (not shown) which compares the current to a threshold, and outputs a "1" or a "0" depending on whether the current through the string is above or below the threshold.

The Flash memory array architecture may enforce a certain set of rules of how data may be accessed and programmed into the Flash array, for example: (1) only entire pages, e.g., 2 KB, 4 KB or 8 KB, may be read or programmed into the Flash array, such that it may not be possible to read or program only a portion of a page; (2) the entire array may erased at once; (3) it may not be possible to arbitrarily reprogram a page without first erasing the entire array first; and (4) Flash memory devices may include many arrays (blocks), and each block may be erased independently of the other blocks.

As the charge in the floating gate may vary continuously, it may be possible to store more than one bit per transistor (Multi-Level Cell (MLC)), by using the various charge levels to represent different sequences of bits. In a MLC Flash device, pages may be separated by n-levels, corresponding to the number of bits stored per cell. With MLC programming, a page may typically not be programmed simultaneously to all levels. Rather, programming may be broken up into steps (each step containing the phase iteration discussed above), where in each step, a different level is programmed. That is, at each step, all cells that have not reached their target level are programmed to the next programming level in line (starting from the lowest level up to the highest level), while those that have reached their target level are no longer programmed. The target levels may typically correspond to the minimum voltages of the voltage distribution lobes shown in FIG. 3, discussed below.

Figure 3:
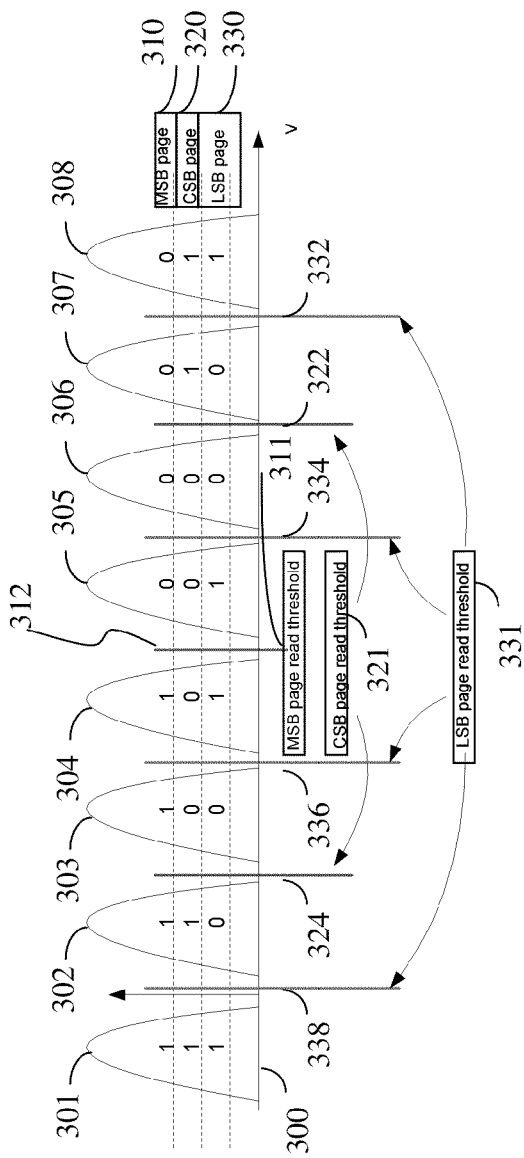
FIG. 3 illustrates prior art charge distributions for storing 3 bits in a Multi-Level Cell Flash device and corresponding read thresholds locations.

FIG. 3 illustrates a prior art example 300 of read thresholds and charge distributions 301-308 for a cell storing three bits of data. For example, as depicted, most significant bit (MSB) 310 may be read based on voltage threshold 312; central significant bit (CSB) 320 may be read based on voltage thresholds 322 and 324; and least significant bit (LSB) 330 may be read based on voltage thresholds 338, 336, 334, and 332.

The programming steps for MLC Flash devices may typically be done by a Flash device controller which may typically be found on the same silicon die as the Flash array/block cells. However, Flash test modes or special interface commands may also allow for such programming control from outside the Flash memory device. This interface may typically include methods of controlling the required programming voltage thresholds (target program levels), ISPP steps, bias voltages, read voltage thresholds and other types of control.

It will be recognized that the charge in floating gate may not be infinitely deterministic, but suffers from some randomness or noise. The sources of noise may be several.

First, during programming, the amount of charge injected at each charge injection phase is random. This randomness may typically be limited by forcing small ISPP steps. Alternatively, the larger the ISPP step, the larger the randomness. As a result, once all cells in a page have passed the required threshold during a programming algorithm, the charge found at the cells may be distributed with some variance, (mainly) starting at the minimum required threshold. The larger the ISPP step the larger the distribution of the lobe. This randomness, in the large part, may be unpredictable.

Second, there may be a detrapping effect after retention and program/erase (P/E) cycles. For example, after many program/erase (P/E) cycles, there may be accumulated trap charge. This charge may be detrapped over time and may change the amount of charge being measured at the cell. The amount of accumulated traps is a random process which, in large part, may be unpredictable. As a result, after a long duration, the charge distributions may become larger and their means may shift.

Third, there may be additional "noise" inducers such as coupling, program disturbs and read disturbs. This type of "noise" sources may be more predictable, and typically do not constitute the main bulk of noise.

As stated, embodiments of the present invention may improve data security by making use of the ability to inject different amounts of charge to different cells. Accordingly, use of MLC Flash for purposes of the present invention may require special interface commands.

In the following several related systems and methods of performing analog encryption may now be described according to an embodiment of the present invention. Additionally or alternatively to using variable thresholds to represent logical values, systems and methods according to embodiments of the invention may, for example, rely on the inherent noise in the Flash medium in order to complicate code attacking. For simplicity of the present description, an embodiment in which each cell stores one bit of data is discussed; however, it will be understood that multiple bits per cell may likewise be programmed using the techniques presented.

According to embodiments of the invention, different programming threshold levels may be used for each cell and/or the thresholds may represent different data values. Accordingly, in order to read data stored in a cell encrypted using embodiments of the present invention, a decryption operation must be performed to determine at least one read parameter, and the cell read or interpreted according to the read parameter. Thus, for example, the determination of which programmed levels are used as thresholds may be made based on an encryption function, such as an encryption key stream, e.g., a threshold level encryption key stream.

The threshold encryption stream may be used to determine cell programming and/or reading parameters, such as threshold locations, lobe distributions, and logical value assignments for each lobe. Alternatively, or in addition, noise may be used to further hide data. For example, according to embodiments of the invention, in order to render the analog-encrypted data further difficult to read or interpret, the ISPP may be large, such that the statistical distribution of voltages for any particular lobe may be relatively wide. In another example, the distance between lobes may be small, in order to make it more difficult for an attacker to distinguish between programmed values, particularly where the read thresholds are unknown.

For example, where the threshold level encryption key stream entries contain a single value for each cell, one threshold per cell may be determined, and at each cell a lobe may have one of two locations based on the location of the threshold voltage for the cell (e.g., for programming a 1 or 0 with a different threshold settings to differentiate the 1 or 0 state of a lobe at each cell). The size of the lobes may be determined, after the initial programming level is selected from the threshold level encryption key stream entry, for example, by setting the size of the incremental stepped pulse programming (ISPP).

In some embodiments of the invention, there may be more programming lobes than data values to be read from the cell. For example, a MLC may be programmed to one of four values, but may represent one data bit, such that each pair of lobes represents a single bit. Likewise, a MLC may be programmed to one of eight values, but may represent one data bit, such that each set of four lobes represents a single bit, or each pair may represent a pair of bits. The assignment of lobes to data values may be determined by an encryption or decryption function.

Embodiments of the present invention may also provide a system and method for security of data stored in a memory using read processes applied by the memory controller. Thus, for example, if a controller determines that a read command is unauthorized or does not have the correct key based on the occurrence of a greater number of errors than a threshold number of allowable errors, in which case, the controller may refuse to provide the data, or may fail to decrypt the data at all, rendering the data unreadable.

According to an embodiment of the invention, a system and method may be provided in which if the number of errors exceeds a predefined threshold, none or substantially none of the data may be decipherable. In such an example, an encryption step and an encoding step may be combined, for example, using BCH (Bose, Ray-Chaudhuri, Hocquenghem) codes. An auxiliary key generated from BCH encoding may be used to generate a key stream. Redundancy to the cipher data (encrypted data) may be further generated using a second BCH encoder. In decoding, a code word may be decoded using a BCH code that corrects up to a pre-determined number of errors. If there are errors in that decoding step, the auxiliary key that may be generated thereafter in the decoding will be wrong and the result in such an example will be a garbled code word.

In an embodiment in accordance with the present invention, such an encoding scheme may be used to program information on a memory, such as on a Flash device, where following a period of time, the storage may deteriorate. According to some embodiments of the invention, a partial deterioration of information stored in a memory, such as Flash storage, may cause the information to become completely unreadable, thereby rendering a self-destructing message, where the message self-destructs, for example, according to the deterioration rate of the memory storage or according to another pre-selected method of memory cell deterioration. Such a scheme may take advantage of fluctuations in the charges that may be held in the cells of the memory. Over time, the cell charges may become slightly corrupt, and become beyond the error correction capacity of the code. The scheme provides that an expiration point may occur for the stored code, after which, due to too many errors, the code becomes garbled and un-decodable.

Figure 4:
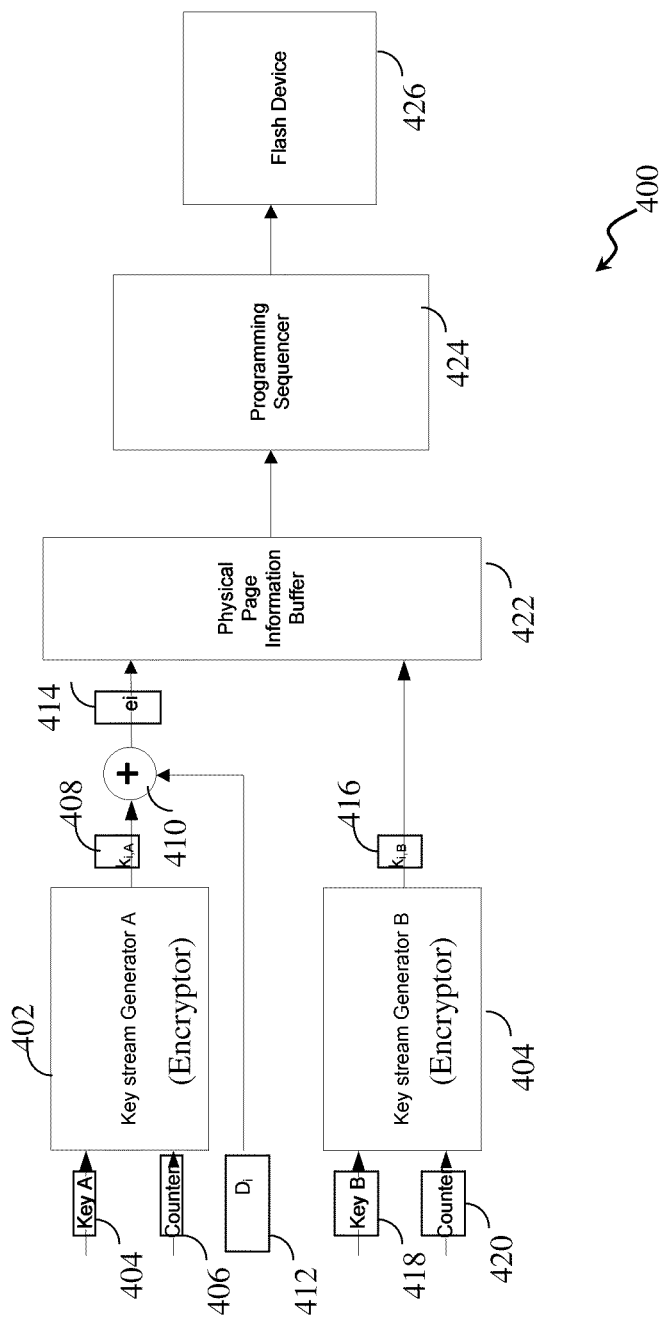
FIG. 4 illustrates an analog encryption flow, according to an embodiment of the invention.

Reference is made to FIG. 4, which illustrates an analog encryption system 400 according to an embodiment of the invention. It will be understood that modules such as encryption modules 402, 404, combiner (shown as an XOR element) 410, and programming sequencer unit 424 may be implemented in computer hardware, such as in circuits and/or other hardware processing units, or alternatively in software, such as in computer program code which maybe implemented by a processor, where the computer program code may be stored, for example, in a computer memory, or a combination of hardware and software. The memory may include or be associated with programming modules which when executed by a processor, function as described herein. In some embodiments of the invention, modules 402, 404, 410, 424 may be instructions stored on non-transitory computer readable medium, such as server storage (from which each of elements 402, 404, 410, 424 may be downloaded and installed (e.g., to the memory of a processor, such as RAM memory)), portable memory such as compact disk (CD) memory and/or DVD memory and system memory, such as a hard drive or solid state drive (SSD) on which elements 402, 404, 410, 424 may already be installed, etc.

Analog encryption system 400 may include two encryption modules 402 and 404. A first encryption module 402 may generate, using key A 403 and counter 406, a data bit encryption stream, $k_{i,A}$ 408, which may be combined, for example, by an XOR operation 410, with original data $D_i$ 412 to form cipher data stream (encrypted data) $e_i$ 414.

A second encryption module 404 may generate a threshold level encryption key stream $k_{i,B}$ 416, e.g., using key B 418 and counter 420. It will be understood that counter 420 may be different from or the same as counter 406, depending on the implementation. The cipher data stream $e_i$ 414 and threshold level encryption key stream $k_{i,B}$ 416 may be stored in an information buffer, such as a page-sized information buffer 422. Programming sequencer unit 424 may program the data stored in buffer 422 into Flash memory 426. Programming sequencer unit 424 may use threshold level encryption key stream $k_{i,B}$ 416 to determine how to store the bits at each cell, for example, as described in further detail below. Programming sequencer unit 424 may use Flash memory interface commands to perform its task. To understand example tasks of the programming sequencer in an exemplary embodiment of the invention, several methods of performing the programming operation are now described.

Figure 5:
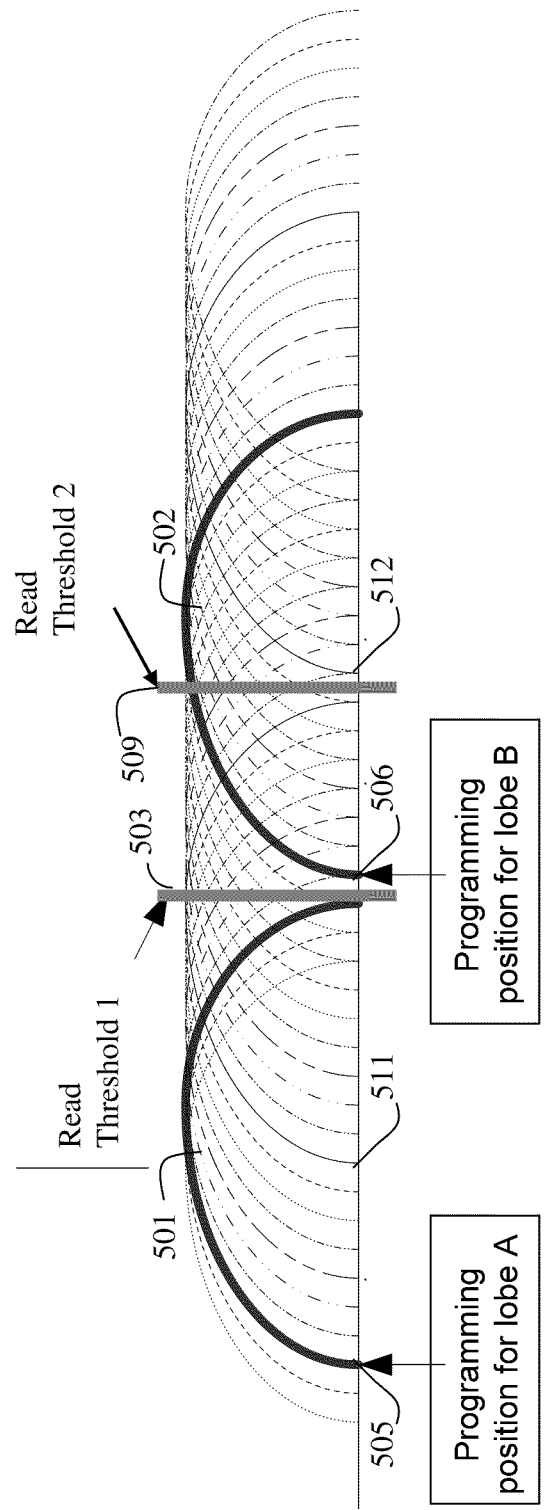
FIG. 5 illustrates analog encryption with programming for two possible lobes, according to an embodiment of the invention.

Reference is made to FIG. 5, which depicts an example of a variable programming and read voltage threshold in accordance with an embodiment of the invention. As depicted, the output of an encryption function, e.g., as depicted in FIG. 4, may be used to determine the location of a programming (and read) threshold for a cell. For example, one value of $k_{i,B}$ may determine programming for lobe B starting at programming position 506 if $e_i$ is a logical 0, and for lobe A starting at programming position 505 if $e_i$ is a logical 1, with the read threshold set at voltage level 503. A different value of $k_{i,B}$ may determine programming for lobe B starting at programming position 512 if $e_i$ is a logical 0, and for lobe A starting at programming position 511 if $e_i$ is a logical 1, with read threshold 509. Thus, for example, an attacker not knowing the read thresholds and obtaining a voltage level between thresholds 503 and 509 would not know whether to interpret the value as a 0 (based on read threshold 503) or a 1 (based on read threshold 509). Accordingly, an attacker obtaining the raw voltage levels would not be able to decipher the stored data without knowing the threshold values. It will be understood that FIG. 5 is schematic in nature, and that any number of program/read thresholds may be implemented.

Furthermore, it will be recognized that as the cell may be programmed with large ISPP, the result will wide lobes, in which case, an attacker may have great difficulty determining the read thresholds based on statistical analysis of the voltage levels alone. Note that the lobes may also be wide due to inherent randomness of the physical medium, which may not be predicted.

It will be further understood that typically, the NAND Flash device may program an entire page simultaneously, and each cell is programmed to one of two lobes. Therefore, in order to perform the programming described above, programming sequencer unit 424 may, for example, first program all cells with the second lowest target lobe or higher positions to the second lowest lobe position. Next, it may modify the programming thresholds to that of an erased lobe, and that of the third lowest lobe position and program all cells with the third lowest target lobe or higher positions to the third lowest lobe position. The programming sequencer may then proceed similarly to cells with higher targets, etc.

Figure 6:
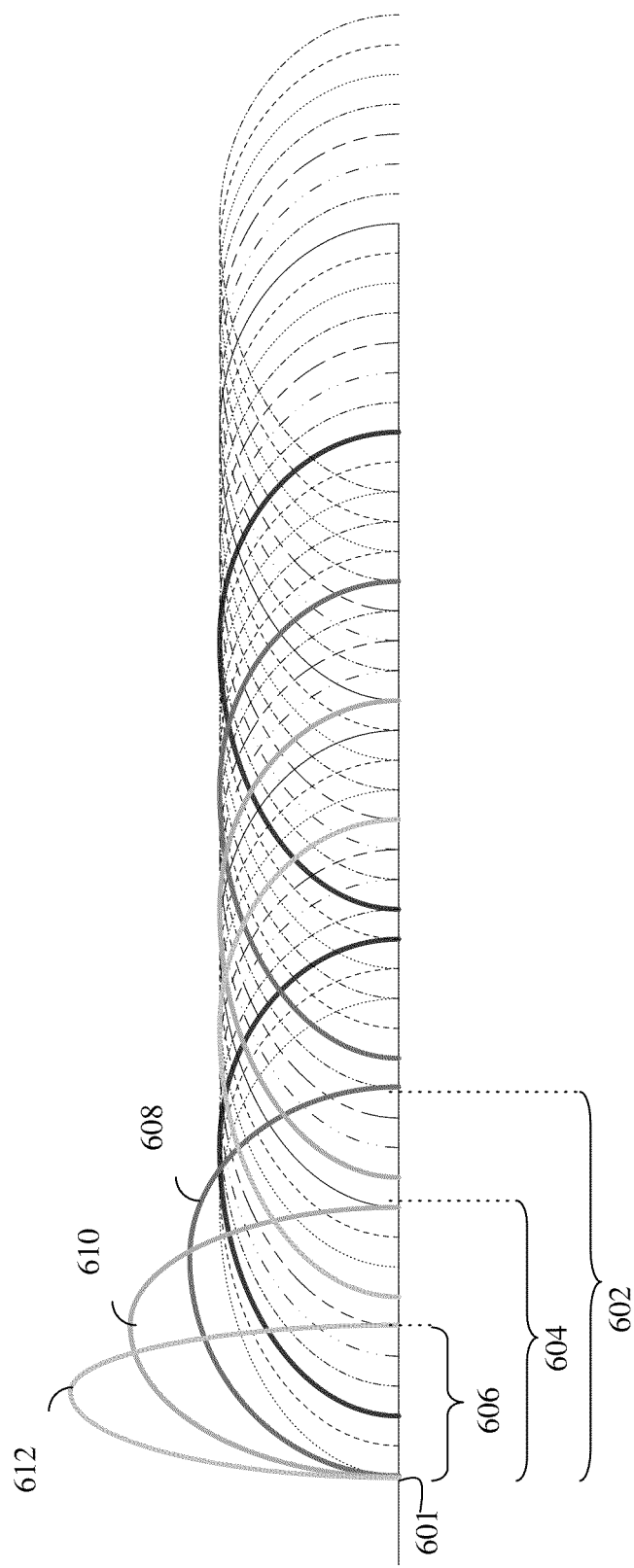
FIG. 6 illustrates analog encryption using additional pulse programming, according to an embodiment of the invention.

According to embodiments of the invention in which the entire programming window may be limited, the lowest and highest starting programming values may also be limited. Therefore, in such a situation, if a cell is found to be programmed in ranges at the edges of the window, it is possible that the voltage threshold may easily be inferred. To make inference of the voltage threshold in such instances more difficult, the programming distributions as shown in FIG. 6 may be preferred. As depicted, for example, a cell may be programmed with a boundary voltage level, e.g., program threshold 601, using a small ISPP value, thereby programming the voltage level with greater precision, resulting in a narrow lobe, spanning voltage range 606, and making inference of read voltage level more difficult. Alternately, the cell may be programmed with a boundary voltage level, e.g., program threshold 601, using a medium ISPP value, thereby programming the voltage level with less precision, resulting in a medium lobe 610, spanning voltage range 604. The cell may be programmed with a boundary voltage level, e.g., program threshold 601, using a large ISPP value, thereby programming the voltage level with even less precision, resulting in a large lobe 608, spanning voltage range 602.

Figure 7:
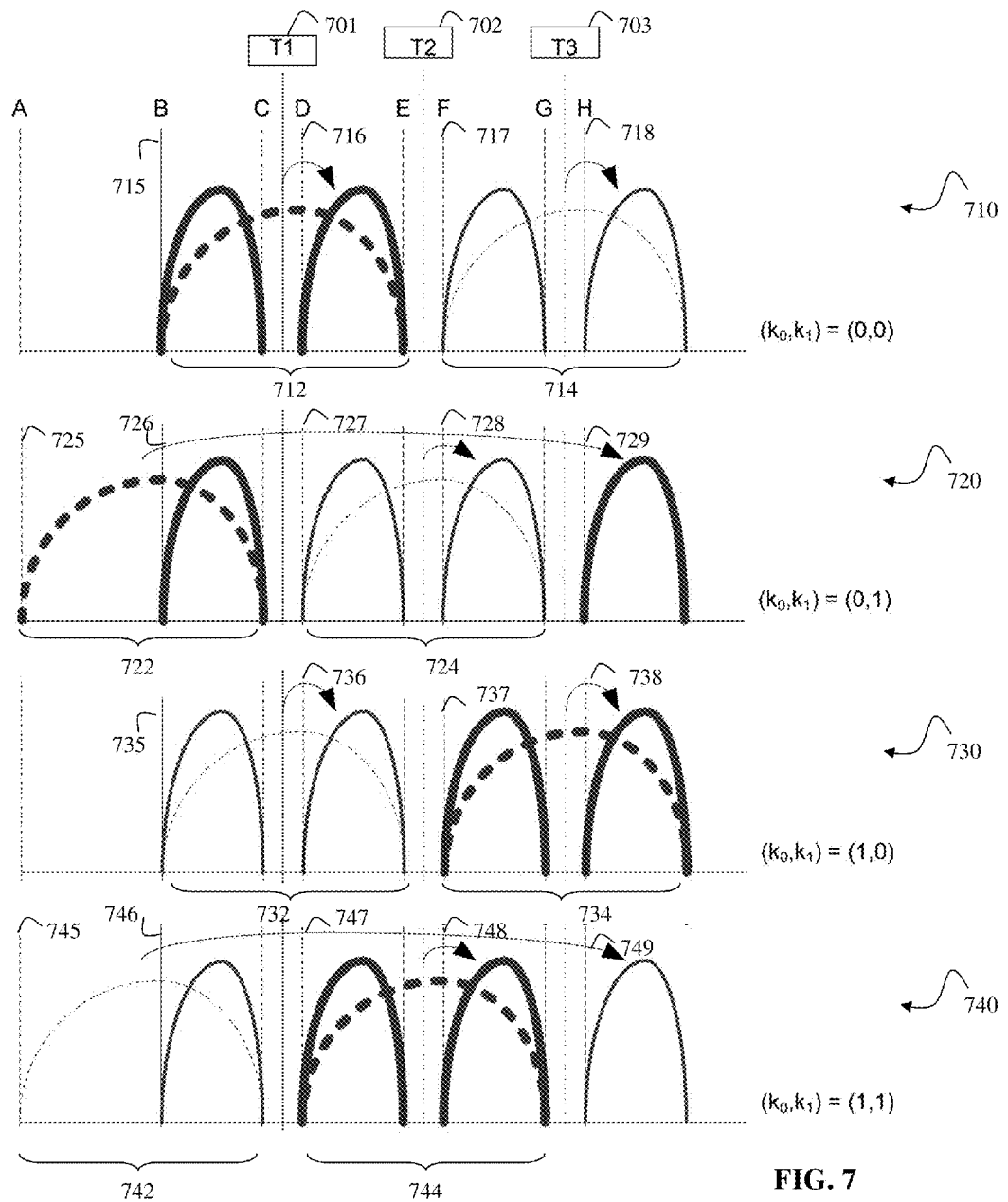
FIG. 7 illustrates analog encryption with programming for four possible lobes, according to an embodiment of the invention.
Figure 8A:
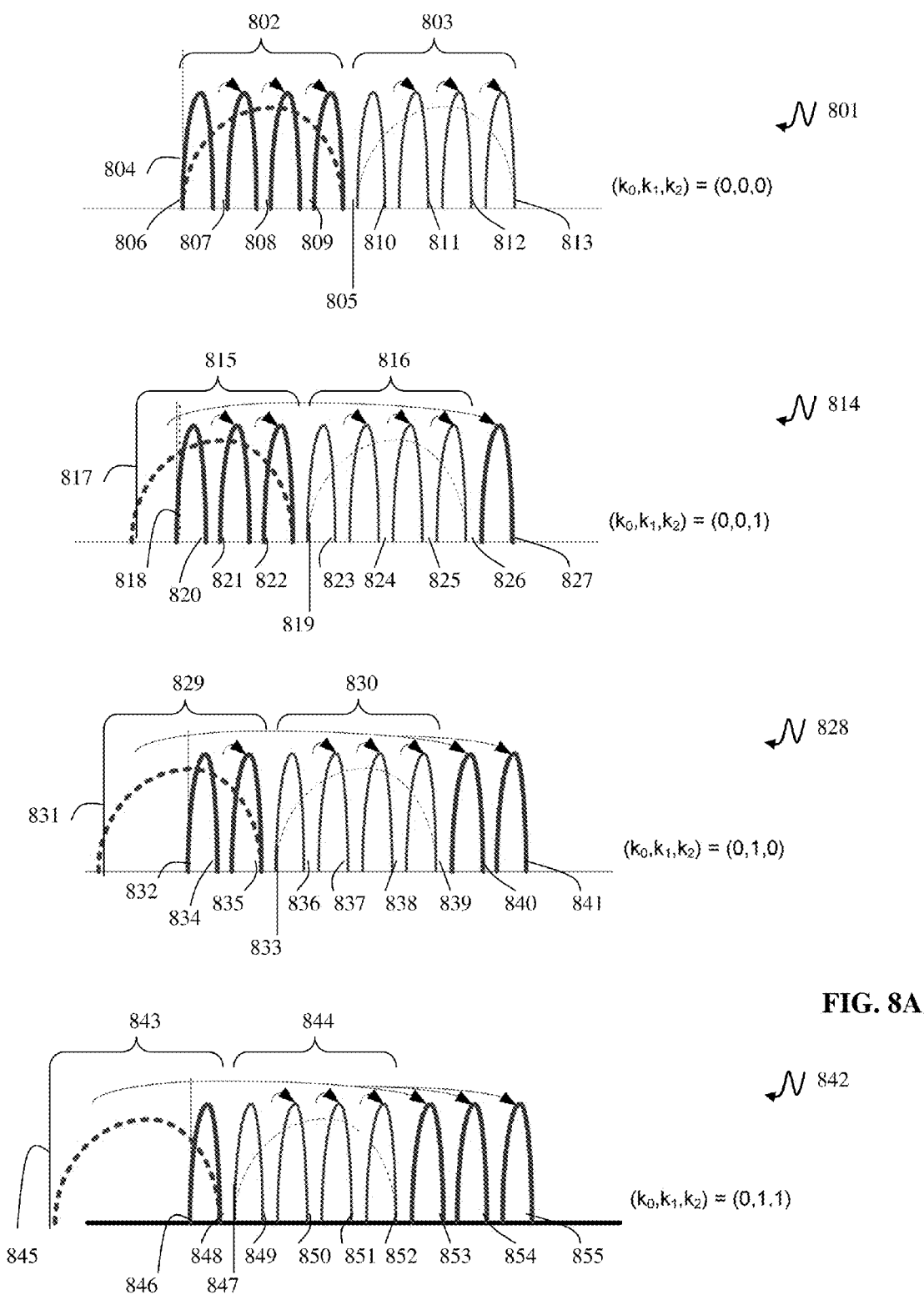
FIGS. 8A-8B illustrate analog encryption with programming for eight possible lobes, according to an embodiment of the invention.
Figure 8B:
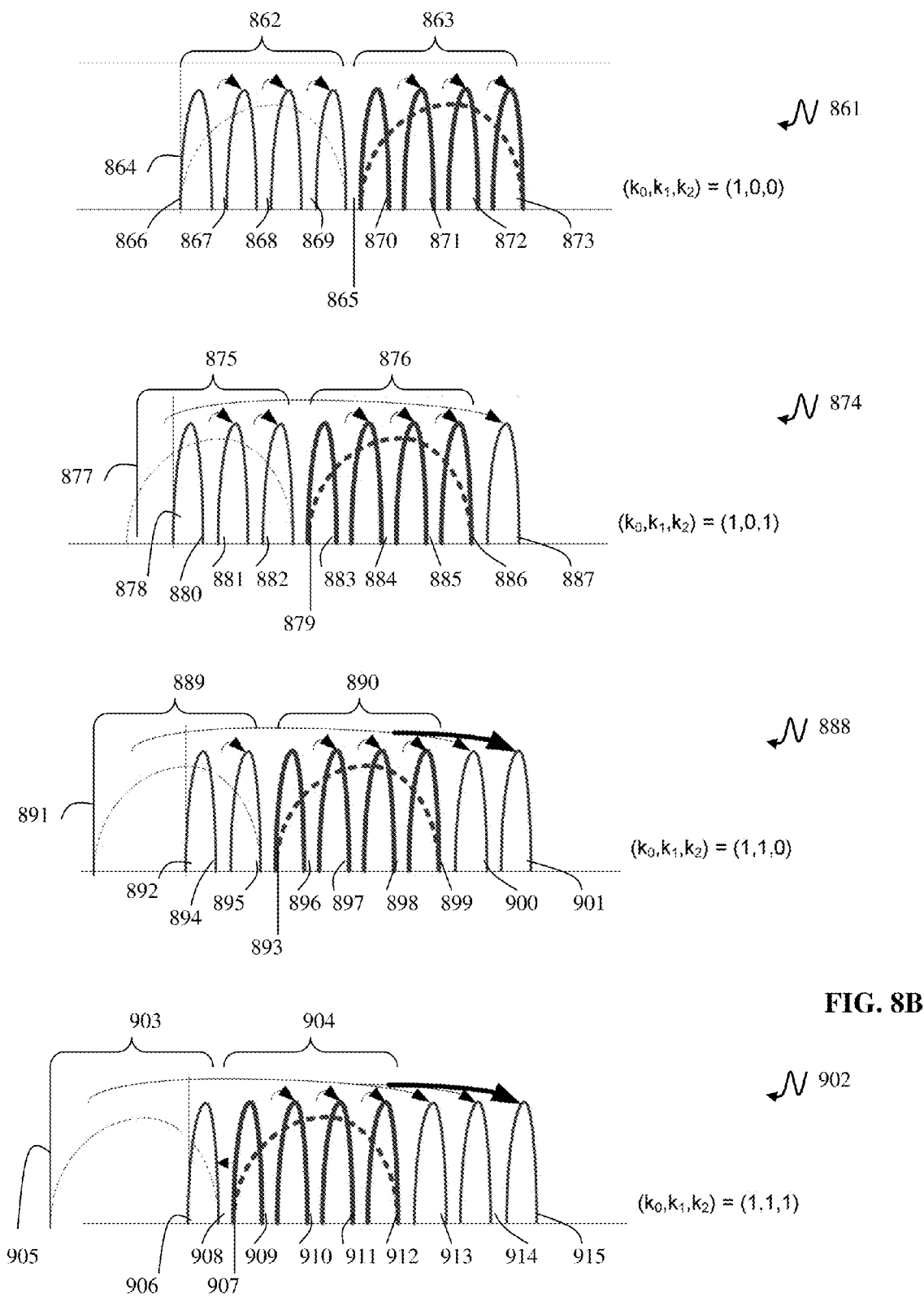

FIGS. 7 and 8A-8B depict methods for programming cells using analog encryption in accordance with embodiments of the invention. In the depicted figures, the $k_{i,B}$ data set $(k_0,k_1)$, e.g., 416 in FIG. 4, may be the result of one or more encryption functions, and may determine programming thresholds for a memory cell. FIG. 7 depicts the use of four voltage level distribution lobes to store a bit of data in accordance with an embodiment of the invention. The data set $k_{i,B}$ including bits $(k_0,k_1)$ may be determined based on one or more encryption functions. Based on the value of $k_{i,B}$, one or more programming thresholds may be determined.

If, as shown at graph 710, the value of $k_{i,B}$ is (0,0) then the cell may be programmed based on programming threshold 715 or 717, storing the charge at a voltage level in either the wide thick-lined lobe (712) or wide fine-lined lobe (714), depending on whether $e_i$ is "1" or "0". That is, using a large ISPP, the voltage level of the cell may be roughly programmed to one of the wide distribution lobes. It will be recognized the ISPP may be selected for this coarse programming such that the resulting voltage level may be anywhere within either of the wide lobes. Next, in order to produce the narrow lobes, if a voltage level is in the middle of the lobe, for example, in the position between C and D or between G and H, another programming operation may be performed to program the charge to an adjacent programming threshold using a smaller ISPP, e.g., based on threshold 716 or 718, respectively. Accordingly, the result is a voltage distribution in any of four narrow lobes representing two logical values. In the read process, if an output of a decryption function for a cell is $k_{i,B}$ of (0,0), then only one read threshold (702) is required.

Graphs 720, 730 and 740 depict programming of cells based on different values of the stream $k_{i,B}$. Thus, for example, if $k_{i,B}$ is (0,1), as shown at graph 720, the system may program the cell based on threshold 701, with the lower portion of wide lobe 722 being mapped to programming threshold 729. That is, cells to store a logical 1 may be programmed to voltage level A (725), using wide ISPPs, rendering the distribution within thick-lined voltage distribution lobe 722. Then, it may be determined whether there are any cells having voltage level below point B (726), in which case, such cells may be further programmed, using narrower ISPPs to the programming threshold H (729), creating a narrow voltage distribution lobe. Likewise, if the value of $e_i$ was a logical 0, a cell may be programmed to wide thin-lined lobe 724 using a large ISPPs based on programming threshold voltage level 727. Then, if there are cells having voltages between E and F, those cells may be further programmed, e.g., using a narrower ISPP to position F (728). In the read process, for a cell having $k_{i,B}$ of (0,1), in order to distinguish between $e_i$=0 and $e_i$=1, the read voltage level would be compare against thresholds 701 and 703, such that if the voltage level was detected to lie between 701 and 703, then $e_i$ was 0 and 1 otherwise.

Similar methods may be used to program cases where $k_{i,B}$ is (1,0) and (1,1) according to embodiments of the invention shown in graphs 730 and 740, respectively. If $k_{i,B}$ is (1,0) then the system may first program the cell to either of wide lobes 734 or 732 with a large ISPP, based on programming thresholds 737 and 735, respectively. Then cells having voltage levels between C and D and between G and H may be programmed using programming threshold 736 and 738, respectively, using a smaller ISPP to thereby create the four voltage level distribution lobes as shown.

If, $k_{i,B}$ is (1,1) then the system may first program the cell to either of wide lobes 742 or 744 with a large ISPP, based on programming thresholds 745 and 747, respectively. Then cells having voltage levels lower than B 746 and between E and F may be programmed using programming threshold 749 and 748, respectively, using a smaller ISPP to thereby create the four voltage level distribution lobes as shown.

FIGS. 8A and 8B depict graphs for a MLC having eight voltage levels for storing a data bit, where $k_{i,B}$ is represented by a three-bit data set. Thus, in FIGS. 8A and 8B, data may be hidden within any of eight voltage level distribution lobes, according to an embodiment of the present invention. Cells may be programmed to one of eight voltage levels, where the thresholds are determined by a three-bit (i.e., eight-symbol) $k_{i,B}$, as shown.

If, as shown in lobe graph 801, the value of $k_{i,B}$ is (0,0,0) then the system may, according to an embodiment of the invention, program using a large ISPP to program threshold 804 or 805, resulting in wide lobes 802 or 803, respectively, depending on whether $e_i$ was "1" or "0". Next, narrow distribution lobes may be created by using narrow ISPP to program cells having voltage levels between the lobes, e.g., between lobes 806 and 807, etc. Thus, to program a cell to one of thick-lined lobes 806, 807, 808, 809 (if the value of $e_i$ was 1, for example), a cell may be first programmed to wide lobe 802, e.g., using a large ISPP, based on programming threshold 804. Then, smaller ISPP may be used to program the cell to generate lobes 806, 807, 808, 809. It will be understood that once programmed within wide lobe 802, whether the voltage level of a cell falls into 806, 807, 808 or 809 may be determined by the random nature of the programming process and cannot be predicted. A similar method may be used to program lobes in region 803 at 810, 811, 812 or 813. For example if the value of $e_i$ was a 0, a cell may be first programmed to wide lobe 803, e.g., using a large ISPP, based on programming threshold 805. Then, smaller ISPP may be used to program the cell to generate lobes 810, 811, 812, 813. It will be understood that in some embodiments of the invention, the narrow programming may be performed in stages.

Similar programming and reading processes will be understood for $k_{i,B}$ values of (0,0,1), (0,1,0) . . . (1,1,1), as shown in graphs 814, 828 . . . 902.

It will be understood that a higher number of lobes (e.g., greater than 8) may also possible according to embodiments of the invention. One may choose to eliminate the slots created between lobes after programming the wider lobes. That is, using similar programming methods as described in FIG. 6, while using the cyclic programming ideas illustrated in FIGS. 7, 8A, and 8B.

It will be recognized that the variable threshold process described above may likewise be applied to MLC cells programmed with two data bits of the $e_i$ data stream (in the case of FIG. 7), or three data bits of the $e_i$ data stream (in the case of FIGS. 8A and 8B). However, it will be recognized that there be less security because the cells may need to be programmed with smaller ISPP in order to ensure specific programming within narrow lobes corresponding to the 2-bit and 3-bit voltage levels. According to some embodiments of the invention, to generate such randomness, a different page may be programmed with one wide lobe and the decision of which of the 2 sub-lobes or 4 sub-lobes to use may depend on the corresponding cell value in that reference page.

Figure 9:
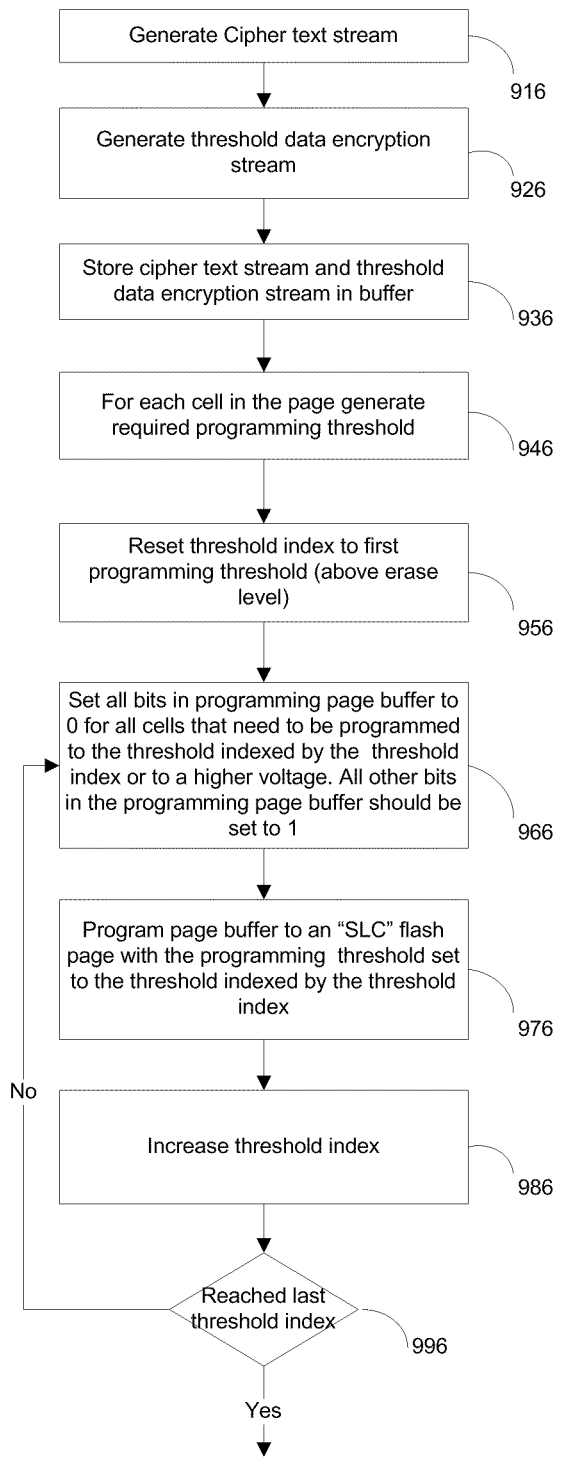
FIG. 9 illustrates a process flow for analog encryption according to an embodiment of the invention.

Reference is now made to FIG. 9, which illustrates a process flow for analog encryption, according to an embodiment of the present invention. The process described may be executed, for example, by suitable elements of a system for analog encryption such as illustrated in FIG. 4. Elements such as encryption modules 402, 404 and programming sequencer 424, may be computer hardware elements (e.g., circuits containing processing elements capable of executing the steps of FIG. 9, or the elements may be programmed modules (modules of computer program code), whose functionality may be executed by a computer processor or other computer hardware, or a combination thereof.

At stage 916, a cipher data stream may be generated. Such a cipher data stream may be generated, for example, by a first encryption module based on an encryption function performed on a data stream, optionally using a key and a counter.

At stage 926, a threshold level encryption key stream, $k_{i,B}$, may be generated. Such a threshold level encryption key stream may be generated by a second encryption module using an encryption function, for example, based on a key and a counter. As described above, the threshold level encryption key stream may determine at least one parameter of storage in the memory, e.g., a program threshold voltage level. It will be understood that the encryption function performed by the second encryption module may be the same or different from the encryption function performed by the first encryption module. Furthermore, it will be understood that the second encryption module may use the same or different parameters (e.g., key, counter) as the first encryption module.

At stage 936, the cipher data stream and the threshold level encryption key stream may be stored in a buffer memory. In some embodiments of the invention, each $k_{i,B}$ value in the threshold level encryption key stream may be one or more binary values, which may be stored in the buffer in association with the corresponding cipher data stream bits.

The data stored in the buffer may be then transferred into the memory using the corresponding parameters based on the threshold level encryption key stream, as described below in connection with stages 946-996.

At stage 946, for each cell in the page, a required programming voltage threshold is generated. Optionally, the block containing the page me be erased, if it had not yet been erased.

At stage 956, a programming threshold voltage index is reset (or set) to an initial programming voltage threshold above the erase level. A maximum value of the threshold voltage index may be determined, for example, based on the number of bits in each value of the threshold level encryption key stream. Thus, for example, for a three-bit threshold level encryption key stream, there may be eight voltage levels to be programmed, and the maximum threshold will be determined accordingly.

At stage 966, all the bits in the buffer may be set to 0 for all cells that are to be programmed to at least the threshold level indicated by the threshold voltage index (i.e., then-current threshold voltage index or higher). All other bits in the buffer, i.e., those that are not set to be programmed to at least the threshold level indicated by the threshold voltage index, may be set to 1. The page of data to be programmed to each page in any programming round is referred to as the page buffer. It will be understood that there may be a variety of ways to implement the page buffer. For example, in one embodiment, there may be a master buffer for storing the original cipher data and the threshold level encryption key streams, and a separate page buffer for storing the different values to be stored in each round of programming. In another embodiment, the page buffer may comprise memory cells in the same buffer in which the original cipher data is stored. In yet another embodiment, there may be a real-time logical operation performed on the original cipher data and the corresponding threshold level encryption key stream to obtain the page buffer data "on the fly" to send to be programmed.

At stage 976, the page buffer data is programmed to a flash page based on single-level cell programming, in which the programming threshold is set to the threshold voltage index. Thus, as a result of the programming operation, the cells to be programmed to a logical 0 have a voltage level at least equal to the threshold voltage index, and the remaining cells remain untouched. It will be understood, as discussed above, that the voltage level to which any cell is to be programmed depends on the cipher data (0 or 1) as well as the value of the threshold level encryption key stream $k_{i,B}$, which determines the programming scheme corresponding to the cipher data to be stored. It will be understood that in some embodiments of the invention, the cell programming may include additional steps (not shown), such as performing a first coarse programming operation using a wide ISPP value, and then, if the resulting voltage level is in a gap between desired lobes, performing a fine programming operation using a narrow ISPP. In some embodiments of the invention, the ISPP may be determined based on the target programming threshold.

At stage 986, the threshold voltage index is increased by an increment, and if the last threshold voltage index has not been reached, at stage 996, steps 966-986 are repeated. In this manner, cells that are to be programmed to a high voltage level will undergo a series of programming operations to incrementally increasing threshold voltage levels, until the desired threshold voltage level is attained.

Common encryption schemes may allow deciphering data even if there are some errors arising from decryption of the data. According to embodiments of the invention, a system and method for analog encryption may be provided in which if too many errors occur in decoding or decrypting the data, e.g., if the number of errors passes a predefined threshold, then none or substantially none of the data may be decipherable.

For example, an embodiment of the present invention may provide that an encryption step and an encoding step may be combined. In the following example, an example is provided using BCH codes; however, it will be understood that any encoding scheme may be used, e.g., Reed-Solomon, Turbo codes, etc.

First, a number of constants may be defined. $t_{code}$ may represent the code correction capability. For example, $t_{code}=3$ means that the code corrects up to 3 errors. $Q_{BCH}$ may represent the number of bits in the finite field over which the BCH code is defined. For example, for more than 2 KB code-words, $Q_{BCH}>=15$. $t_{key}$ may represent an equivalent code correction capability corresponding to a given encryption key length. For example, if the encryption key is 128 bits long, $t_{key}=\text{ceil}(128/Q_{BCH})$ would be needed. Thus, with the numbers mentioned above, $t_{key}=9$.

Figure 10:
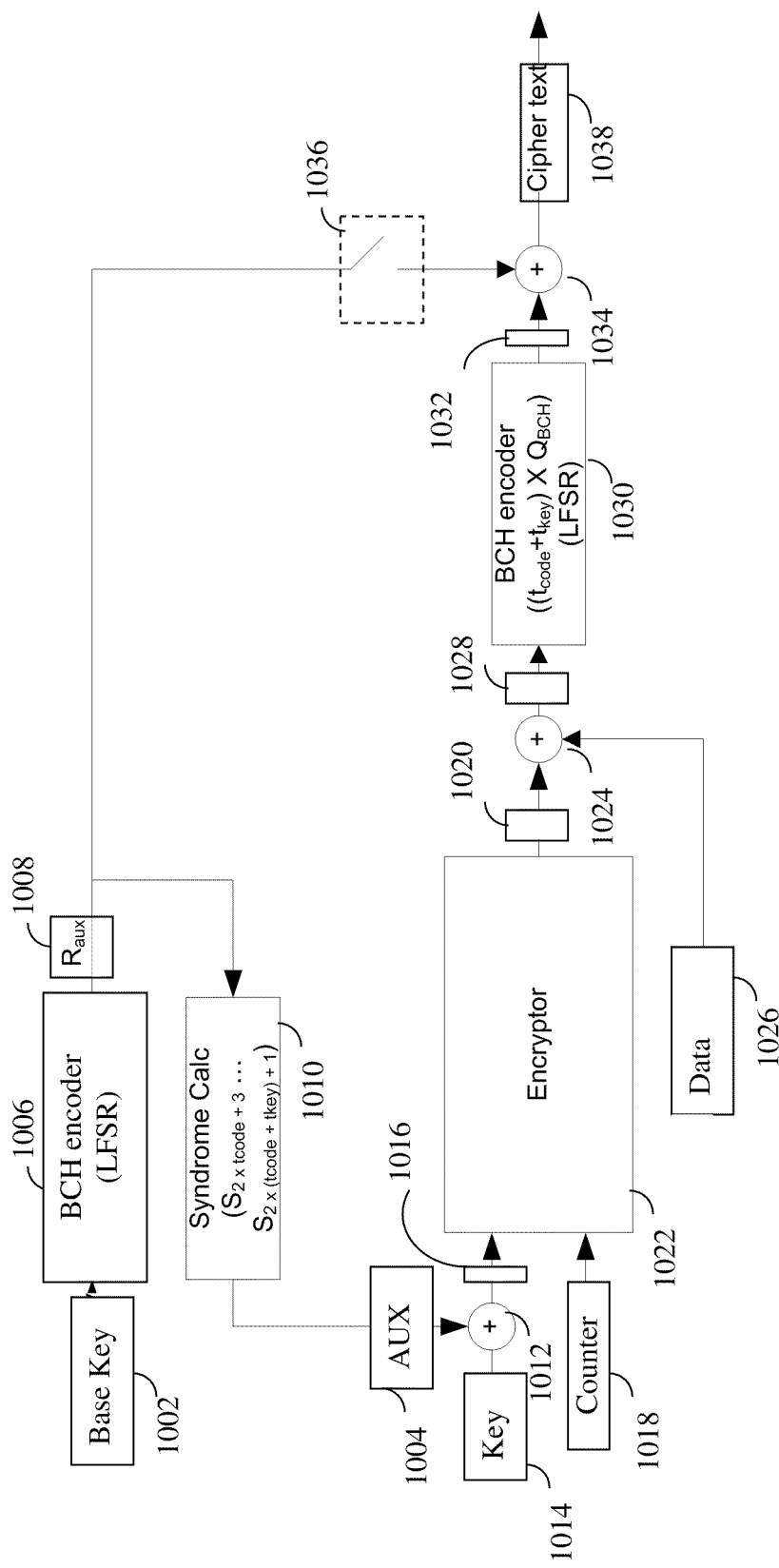
FIG. 10 illustrates a system for limited error encryption according to an embodiment of the invention.

Reference is now made to FIG. 10, which illustrates a system for limited encryption, according to an embodiment of the present invention. The system may provide modules, including BCH encoder modules 1006, 1030, syndrome calculation unit 1010, encryption module 1022, switch 1036 and logical units (e.g., XOR) units 1012, 1024, 1034. Such elements may be implemented in computer hardware or software, or a combination thereof. The computer program code, for example, may be stored in a computer memory. The memory may include programming modules (in software) for elements 1006, 1030, 1010, 1022, 1036, 1012, 1024, 1034, which when executed by a processor, function as described in FIGS. 10 and 11 (and perform the processes described in FIGS. 12, 13). Elements 1006, 1030, 1010, 1022, 1036, 1012, 1024, 1034 in software may further be stored on non-transitory computer readable media such as server storage (from which each of elements 1006, 1030, 1010, 1022, 1036, 1012, 1024, 1034 may be downloaded and installed (e.g., to the memory of a processor 838, such as RAM memory)), portable memory such as compact disk (CD) memory and/or DVD memory and system memory, such as a hard drive or solid state drive (SSD) on which elements 1006, 1030, 1010, 1022, 1036, 1012, 1024, 1034 may already be installed.

Referring to FIG. 10, the following encryption system and process may be described:

An arbitrary base key 1002 may be defined, where arbitrary base key 1002 may be used to generate auxiliary key 1004. In such an example, arbitrary base key 1002 may be $t_{key} \times Q_{BCH}$ bits long.

Redundancy for arbitrary base key 1002 may be generated using a BCH encoder (e.g., 1006) of a code that may correct up to $t_{code}$ errors. The overall length of the word generated here is $(t_{code}+t_{key}) \times Q_{BCH}$ bits long (see generated word 1008). Note that the BCH encoder may be a shift register.

The generated codeword 1008 may be used to generate syndrome values (e.g., using syndrome value calculation unit 1010) for elements $2 \times t_{code}+3$, $2 \times t_{code}+5$, $2 \times t_{code}+7$, . . . , $2 \times (t_{code}+t_{key})$. Note that syndrome element j may be defined by $$\sum_{i=1}^{(t_{code}+t_{key})Q_{BCH}} d_i \cdot \alpha^{i \cdot j},$$

where $d_i$ may be bit i of the codeword and $\alpha$ may be a primitive element of the BCH finite field. The syndrome elements (generated at 1010) may be concatenated to generate auxiliary key 1004.

Auxiliary key 1004 may be XOR-ed with cipher key 1014 (using element 1012). The resulting key 1016 may be used with counter 1018 to generate key stream 1020 (a cipher stream). Encryption module 1022 may perform the process of generating key stream (cipher stream) 1020. Any one of many types of encryption modules may be used here for generating key stream (cipher stream) 1020. For example, AES, DES, or any other suitable encryption standard may be used.

Key stream (cipher stream) 1020 may be XOR-ed with original data 1026 (an exclusive or operation may be performed using element 1024) to generate cipher data 1028.

Redundancy 1032 for cipher data 1028 may be generated using a BCH encoder (e.g., 1030) of a code that corrects up to $t_{code}+t_{key}$ errors.

Redundancy 1032 may be XOR-ed (using element 1034) with the codeword 1008, which may be then concatenated to the cipher data (e.g., 1038).

Figure 11:
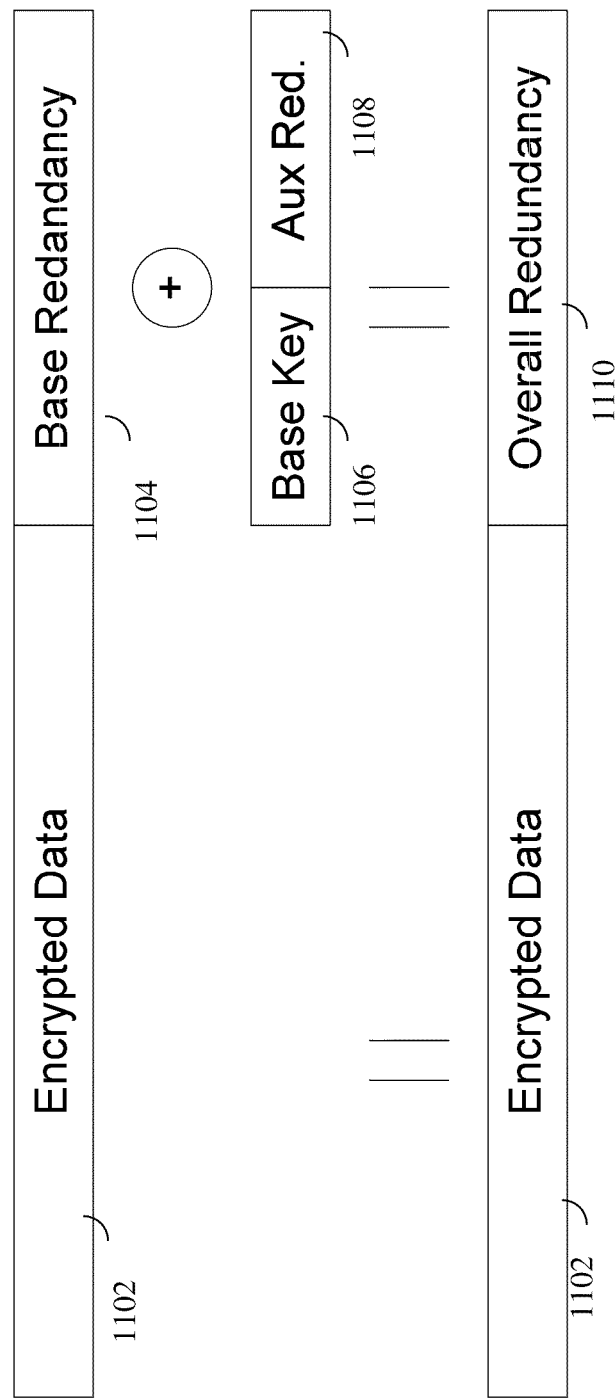
FIG. 11 illustrates a data structure of limited error encryption according to an embodiment of the present invention.

Reference is now made to FIG. 11, which illustrates a data structure of limited error encryption according to an embodiment of the present invention. In FIG. 11 encrypted data 1102 and base redundancy 1104 may be XORed with key 1106 and auxiliary redundancy to create encrypted data 1102 with overall redundancy 1110.

Figure 12:
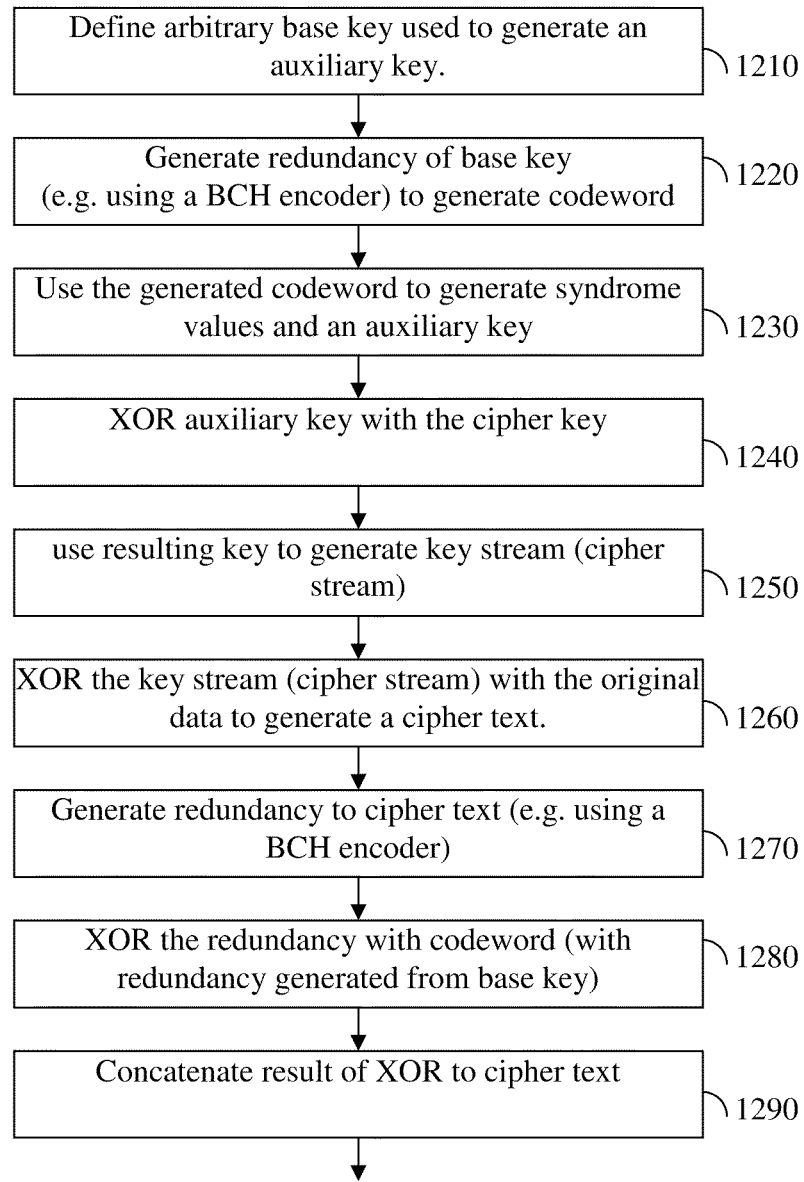
FIG. 12 illustrates a process flow for limited error encryption, according to an embodiment of the present invention.

Reference is now made to FIG. 12, which illustrates a process flow for limited encryption, according to an embodiment of the present invention. Such a process may be executed, for example, by elements 1006, 1030, 1010, 1022, 1036, 1012, 1024, 1034 of FIG. 10.

At stage 1210, an arbitrary base key may be defined (and/or received), which may be used to generate an auxiliary key (e.g., in FIG. 10, the arbitrary base key is shown at 1002).

At stage 1220, the process may generate redundancy of the arbitrary base key (e.g., using a BCH encoder) to generate a codeword. (e.g., in FIG. 10, a BCH encoder is shown at 1006 and the resulting codeword is shown at 1008).

At stage 1230, the generated codeword (e.g., 1008) may be used to generate syndrome values (e.g., by 1010 in FIG. 10) and an auxiliary key (e.g., 1004).

At stage 1240, the auxiliary key (e.g., 1004) may be XOR-ed (the exclusive OR operation) with a cipher key (e.g., 1014) to produce a resulting key (e.g., 1016).

At stage 1250, the resulting key may be used to generate a key stream (e.g., 1020). It will be understood that any suitable type of encryption module (e.g., 1022) may be used.

At stage 1260, the key stream (e.g., 1020) may be XOR-ed with the original data (e.g., 1026) to produce cipher data (e.g., 1028).

At stage 1270, redundancy for the cipher data may be generated, e.g., using a BCH encoder of a code that corrects up to predetermined amount of errors.

At stage 1280, the redundancy of the cipher data (e.g., 1032) may be XOR-ed with the codeword generated from the base key (e.g., 1008).

At stage 1290, the result of the XOR operation of stage 1280 may be concatenated to the cipher data.

Figure 13:
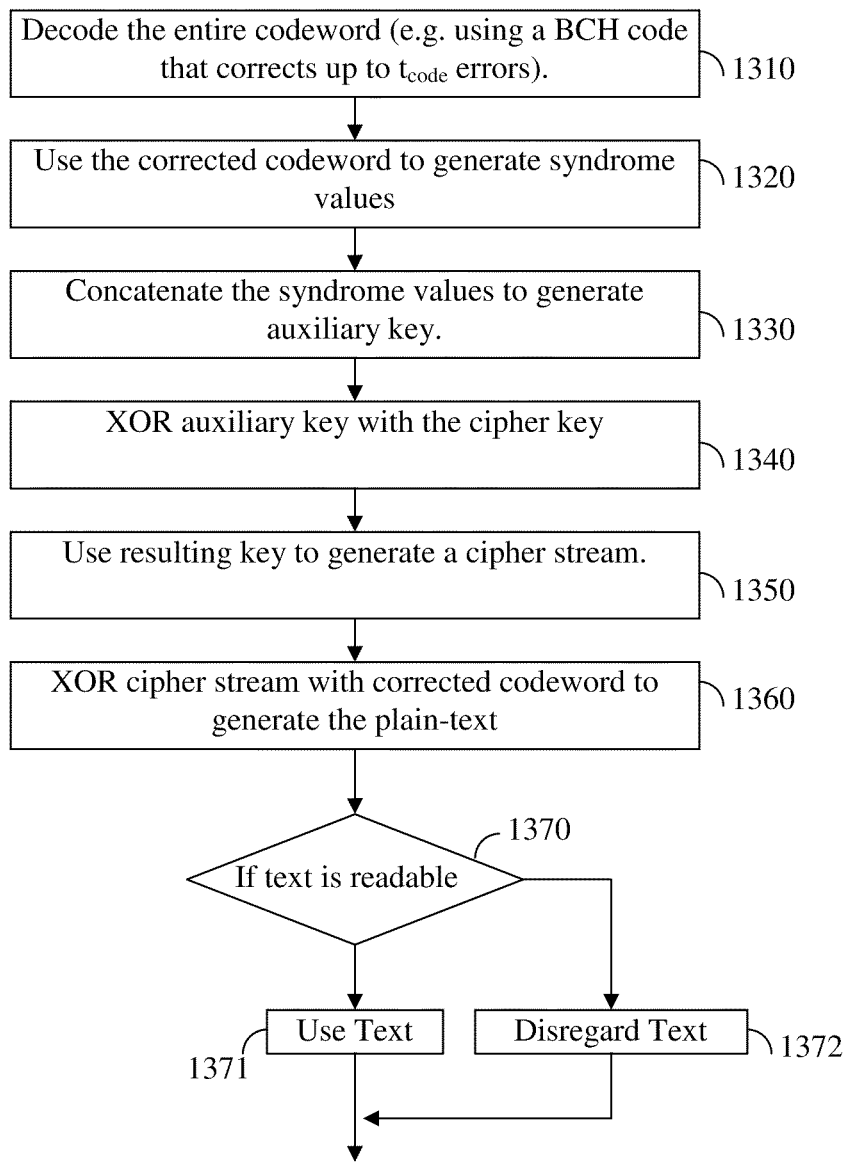
FIG. 13 illustrates a process flow for limited error decryption, according to an embodiment of the present invention.

Reference is now made to FIG. 13, which illustrates a process flow for decryption of a limited encryption, according to an embodiment of the present invention. Such a process may be executed by hardware element, such as a decryptor, or by a processor executing software for decryption, where such software may, for example, be stored on a non-transitory computer readable medium and downloaded or otherwise accessed by the processor.

At stage 1310, the entire codeword may be decoded using a BCH code that corrects up to $t_{code}$ errors.

At stage 1320, the corrected codeword may be used to generate syndrome values for elements:

$$2 \times t_{code}+3, 2 \times t_{code}+5, 2 \times t_{code}+7, \ldots, 2 \times (t_{code}+t_{key})+1.$$

At stage 1330, the syndrome elements may be concatenated to generate the auxiliary key.

At stage 1340, the auxiliary key may be XOR-ed with the cipher key.

At stage 1350, the resulting key may be used to generate a cipher stream.

At stage 1360, the cipher stream may be XOR-ed with the corrected codeword to generate plain text. It will be recognized that if there had been any error in the decoding step, the auxiliary key that would have been generated would have been wrong and the result would have been a garbled codeword.

At stage 1370, the text may be checked for readability. If the text is readable, then the text may be used (stage 1371); otherwise, if the codeword is garbled, and the text is unreadable, it may be disregarded (stage 1372).

The scheme described above may be used to program information on Flash devices such that following a period of time it would be completely unreadable, thereby rendering a the data self-destructing. Such a feature may be used, for example, in organizations that wish to make sure that old data would not be available after some expiration date. According to some embodiments of the invention, following a period of time, the data in Flash devices may become slightly corrupt (due to de-trapping, for instance), beyond the error correction capability of the code. When this becomes the case, the scheme above ensures that the data would be garbled, and the decoding process would disregard the garbled text.

According to some embodiments of the invention, in order to ensure that following some maximum time the information is sufficiently corrupt, the Flash cells may programmed to voltage distribution lobes that are close to one another, and the device may be cycled prior to programming to make sure that the effect of de-trapping is extensive.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method performed by a system that comprises hardware elements, the method comprising:
encrypting input data using a base key and an auxiliary key, wherein decryption of the encrypted input data requires the auxiliary key, and wherein the auxiliary key is only recoverable based on obtaining encrypted input data containing no errors;
modifying programming thresholds and incremental stepped pulse programming (ISPP) size of a Flash memory to increase a number of errors due to retention; and
storing the encrypted input data in the Flash memory;
wherein the encrypting of the input data comprises:
generating cipher data by performing a logical exclusive OR (XOR) operation on a key stream and an input data stream, wherein the key stream is dependent on a first encoding function;
generating intermediate encoded cipher data based on a second encoding function performed on the cipher data; and
generating final encoded cipher data based on the intermediate encoded cipher data and a result of the first encoding function;
wherein the method further comprises generating the key stream by:
performing the first encoding function on the base key to generate a codeword;
using the codeword to generate the auxiliary key and syndrome values;
performing a logical exclusive OR (XOR) operation on the auxiliary key and a cipher key to obtain a combined key; and
using the combined key to generate the key stream.

2. The method of claim 1, wherein the auxiliary key is obtained from a syndrome calculation of the entire codeword.

3. The method of claim 1, further comprising prior to storing the encrypted input data in the flash memory, cycling a Flash memory block that will store the encrypted input data such that following retention a number of errors occur in the encrypted input data to prohibit decoding.

4. A system, comprising:
a syndrome calculation unit arranged to generate an auxiliary key; and
a system portion that is arranged to encrypt input data using a base key and the auxiliary key, wherein decryption of the encrypted input data requires the auxiliary key, and wherein the auxiliary key is only recoverable based on obtaining encrypted input data containing no errors; and
a programming sequencer unit arranged to modify programming thresholds and incremental stepped pulse programming (ISPP) size of a Flash memory to increase a number of errors due to retention; and store the encrypted input data in a Flash memory;
wherein at least one of the syndrome calculation unit and the programming sequencer unit is a hardware element;
a first exclusive OR (XOR) gate that is arranged to generate cipher data by performing a XOR operation on a key stream and an input data stream, wherein the key stream is dependent on a first encoding function;
a first encoder that is arranged to generate intermediate encoded cipher data based on a second encoding function performed on the cipher data;
a second XOR gate that is arranged to generate final encoded cipher data based on the intermediate encoded cipher data and a result of the first encoding function;
a second encoder that is arranged to perform the first encoding function on the base key to generate a codeword; wherein the syndrome calculation unit is arranged to use the codeword to generate the auxiliary key and syndrome values; wherein the first XOR gate is arranged to perform a logical exclusive OR (XOR) operation on the auxiliary key and a cipher key to obtain a combined key; and
and an encryption module that is arranged to use the combined key to generate the key stream.

5. The system of claim 4, wherein the syndrome calculation unit is arranged to obtain the auxiliary key from a syndrome calculation of the entire codeword.

6. The system of claim 4, wherein prior to causing the encoded input data to be stored in the flash memory the programming sequencer unit is configured to cycle a Flash memory block that will store the encrypted input data such that following retention a number of errors occur in the encrypted input data to prohibit decoding.

* * * * *